United States Patent
Cope

(10) Patent No.: US 11,019,245 B2
(45) Date of Patent: May 25, 2021

(54) BUNDLE ADJUSTMENT SYSTEM

(71) Applicant: Spookfish Innovations PTY LTD, Bentley (AU)

(72) Inventor: Simon Cope, Burswood (AU)

(73) Assignee: Spookfish Innovations PTY LTD, Bentley (AU)

(*) Notice: Subject to any disclaimer, the term of this patent is extended or adjusted under 35 U.S.C. 154(b) by 0 days.

(21) Appl. No.: 16/343,706

(22) PCT Filed: Oct. 20, 2017

(86) PCT No.: PCT/AU2017/051144
§ 371 (c)(1),
(2) Date: Apr. 19, 2019

(87) PCT Pub. No.: WO2018/071984
PCT Pub. Date: Apr. 26, 2018

(65) Prior Publication Data
US 2019/0268519 A1 Aug. 29, 2019

(30) Foreign Application Priority Data
Oct. 20, 2016 (AU) ................................ 2016904255

(51) Int. Cl.
*H04N 5/225* (2006.01)
*H04N 5/353* (2011.01)
(Continued)

(52) U.S. Cl.
CPC .......... *H04N 5/2259* (2013.01); *G01C 11/02* (2013.01); *G02B 27/64* (2013.01); *G02B 27/642* (2013.01);
(Continued)

(58) Field of Classification Search
CPC .. H04N 5/217; H04N 5/2259; H04N 5/23287; H04N 5/3532; G06T 7/73;
(Continued)

(56) References Cited

U.S. PATENT DOCUMENTS

| 6,366,734 B1* | 4/2002 | Beran | G01C 11/025 |
| | | | 348/146 |
| 9,071,829 B2* | 6/2015 | Michot | G06T 7/77 |
| 2017/0244880 A1* | 8/2017 | Cope | G01C 11/02 |

FOREIGN PATENT DOCUMENTS

WO    WO 2016/054681 A1    4/2016

OTHER PUBLICATIONS

IP Australia; International Type Search for Provisional Patent Application regarding Australian Patent App. No. 2016904255, dated Apr. 3, 2017.
(Continued)

*Primary Examiner* — Lin Ye
*Assistant Examiner* — Chriss S Yoder, III
(74) *Attorney, Agent, or Firm* — Dunlap Codding, P.C.

(57) ABSTRACT

Bundle adjustment systems and methods are disclosed for determining a solution for orientation information associated with a plurality of image frames captured by at least one rolling shutter camera in a rotating camera lens type imaging system having a camera lens that moves across track in an oscillating manner and captures image frames as the camera lens moves. The system may define a plurality of pose time domain polynomials for the rolling shutter camera, the pose time domain polynomials together defining pose information for the rolling shutter camera for scanlines of an image frame captured by the rolling shutter camera, and each pose time domain polynomial including a plurality of parameters to be adjusted in a bundle adjustment process and carry out a bundle adjustment process using the pose time domain polynomials to produce a bundle adjustment solution
(Continued)

wherein the pose time domain polynomial parameters are adjusted to reduce error.

22 Claims, 7 Drawing Sheets

(51) Int. Cl.
   | | |
   |---|---|
   | G06T 7/73 | (2017.01) |
   | H04N 5/232 | (2006.01) |
   | G02B 27/64 | (2006.01) |
   | G06T 7/80 | (2017.01) |
   | H04N 5/217 | (2011.01) |
   | G03B 15/00 | (2021.01) |
   | G01C 11/02 | (2006.01) |

(52) U.S. Cl.
   CPC ............. *G03B 15/006* (2013.01); *G06T 7/73* (2017.01); *G06T 7/80* (2017.01); *H04N 5/217* (2013.01); *H04N 5/23287* (2013.01); *H04N 5/3532* (2013.01); *G06T 2207/10012* (2013.01); *G06T 2207/10032* (2013.01); *G06T 2207/30181* (2013.01); *G06T 2207/30244* (2013.01)

(58) Field of Classification Search
   CPC ............. G06T 7/80; G06T 2207/10012; G06T 2207/10032; G06T 2207/30181; G06T 2207/30244; G02B 27/64; G02B 27/642; G03B 15/006; G01C 11/02
   See application file for complete search history.

(56) References Cited

OTHER PUBLICATIONS

International Searching Authority/Australian Patent Office; PCT International Search Report and Written Opinion regarding International App. No. PCT/AU2017/051144 dated Dec. 18, 2017.
International Searching Authority/Australian Patent Office; PCT Written Opinion regarding International App. No. PCT/AU2017/051144 dated Oct. 17, 2018.
International Searching Authority/Australian Patent Office; PCT International Preliminary Report on Patentability regarding International App. No. PCT/AU2017/051144 dated Feb. 19, 2019.
Albl et al., "R6P—Rolling Shutter Absolute Pose Problem", 2015 IEEE Conference on Computer Vision and Pattern Recognition (CVPR), Jun. 7-12, 2015, Boston, MA, USA, pp. 2292-2300.
Ait-Aider et al., "Simultaneous Object Pose and Velocity Computation Using a Single View from a Rolling Shutter Camera", Proceedings, Part II, 9th European Conference on Computer Vision (ECCV), May 7-13, 2006, Graz, Austria, pp. 56-68.
Klein et al., "Parallel Tracking and Mapping on a Camera Phone", 8th IEEE International Symposium on Mixed and Augmented Reality (ISMAR), Oct. 19-22, 2009, Orlando, FL, USA.
Hedbord et al., "Rolling Shutter Bundle Adjustment", 2012 IEEE Conference on Computer Vision and Pattern Recognition (CVPR), Jun. 16-21, 2012, Providence, RI, USA.
Saurer et al., "Sparse to Dense 3D Reconstruction from Rolling Shutter Images", 2016 IEEE Conference on Computer Vision and Pattern Recognition (CVPR), Jun. 27-30, 2016, Las Vegas, NV, USA.
Lovegrove, S. et al., "Spline Fusion: A continuous-time representation for visual-inertial fusion with application to rolling shutter cameras", Proceedings of British Machine Vision Conference, Sep. 9-13, 2013, Bristol, UK.
Kroll, N., "3 Tips for Dealing With Rolling Shutter", Apr. 29, 2015 [online] [retrieved from internet on Dec. 4, 2017] <URL: https://www.premiumbeat.com/blog/3tipsfordealingwithrollingshutter/>.
Triggs, B. et al., "Bundle Adjustment—A Modern Synthesis", International Workshop on Vision Algorithms, Sep. 2000, Corfu, Greece. Springer-Verlag, 1883, pp. 298-372, 2000, Lecture Notes in Comptuer Science; Vision Algorithms: Theory and Practice <URL: http://www.springerlink.com/content/plvcrq5bx753a2tn/>.
Lourakis, M. I. A. et al., "SBA: A Software Package for Generic Sparse Bundle Adjustment", ACM Transactions on Mathematical Software, vol. 36, No. 1, Article 2, Mar. 2009, pp. 2:1-2:30.
Pollefeys et al., "Multiple View Geometry Tutorial—Part 1", CVPR 2003 [online] [retrieved from internet on Dec. 5, 2017] <URL: http://www.robots.ox.ac.uk/~az/tutorials/>.
Schinstock et al., "An Alternative Cost Function to Bundle Adjustment used for Aerial Photography from UAVS", ASPRS 2009 Annual Conference, Mar. 9-13, 2009, Baltimore, Maryland, USA.
Li, R. et al., "Rigorous Photogrammetric Processing of HiRISE Stereo Imagery for Mars Topographic Mapping", IEEE Transactions on Geoscience and Remote Sensing, vol. 49, No. 7, Jul. 2011.
Li et al., "Integration of orbital and ground images for enhanced topographic mapping in Mars landed missions", Proceedings of the Annual NASA Science and Technology Conference (NTSC), 2007, College Park, MD. USA [Online] [Retrieved from the Internet on Apr. 7, 2017]<URL: http://esto.nasa.gov/conferences/nstc2007/papers/di_kaichang_a6p2.pdf>.
Magerand et al., "A Generic Rolling Shutter Camera Model and its Application to Dynamic Pose Estimation", International Symposium on 3D data processing, visualization and transmission, 2010.
Oth, L. et al., "Rolling Shutter Camera Calibration", IEEE Conference on Computer Vision and Pattern Recognition (CVPR), Jun. 23-28, 2013.
European Patent Office; Extended European Search Report regarding European Patent App. No. 17862134.8, dated May 4, 2020.
Spookfish Innovations Pty Ltd, Response to European Patent Office dated May 4, 2020 Extended European Search Report regarding European Patent App. No. 17862134.8, dated Dec. 3, 2020.
Schinstock et al., An Alternative Cost Function to Bundle Adjustment Used for Aerial Photography from UAVs:, ASPRS 2009 Annual Conference, Baltimore, Maryland, Mar. 9-13, 2009.
Rengarajan et al., "From Bows to Arrows: Rolling Shutter Rectification of Urban Scenes", 2016 IEEE Conference on Computer Vision and Pattern Recognition; Jun. 2016.

* cited by examiner a)  b)

BUNDLE ADJUSTMENT SYSTEM

INCORPORATION BY REFERENCE

This application is a U.S. national stage application filed under 35 U.S.C. 371 of International Application No. PCT/AU2017/051144, filed Oct. 20, 2017; which claims priority to Australian Application No. AU2016904255, filed Oct. 20, 2016. The entire contents of the above-referenced patent applications are hereby expressly incorporated herein by reference.

FIELD OF THE INVENTION

The present invention relates to a bundle adjustment system for use in an aerial survey of the type that uses rolling shutter image sensors.

BACKGROUND OF THE INVENTION

It is known to provide an aerial camera system that is arranged to capture ground images from a survey aircraft. Typically, as shown in FIG. 1, the aerial camera system 12 is mounted to an underside portion of the survey aircraft 10 and ground images are captured as the survey aircraft 10 moves along defined flight lines. The system is arranged to capture multiple images for each point on the ground, which enables a photogrammetric solution, typically a bundle adjustment process, to be applied to the captured images in order to determine a best case solution for interior and exterior orientation information associated with each camera used and the images captured by each camera. The solution produced by the bundle adjustment process may then be used to produce nadir and/or oblique photomaps.

In order to improve the photogrammetric solution produced by the bundle adjustment process, the number of images taken for each ground point must be increased, and typically this is achieved by capturing images more frequently so that the overlap between successively captured images is increased, and by ensuring that sufficient overlap exists between adjacent flight lines.

Productivity in relation to the ground area captured per hour at a defined resolution can potentially be increased by flying faster, flying higher and/or using a wider field of view (FoV).

However, such techniques typically cause image blur.

Therefore, in order to improve image resolution, motion compensation techniques are employed, for example as described in applicants co-pending International Patent Application No. PCT/AU2015/000606, the contents of which are hereby incorporated by reference.

A typical survey aircraft includes one or more cameras for capturing images, and an inertial navigation system (INS) that is used to determine the movement, position and orientation of the survey aircraft and thereby the position and pose of the camera(s), typically using accelerometers and gyroscopes for each spatial axis.

Because of a combination of manufacturing and assembly tolerances, misalignment exists for each captured image between the camera position and pose values derived from positional information determined by the INS and the actual camera position and pose values.

In FIG. 2, epipolar lines 14 of feature observations for a common control point 16 show the effect of such misalignments on the reprojection accuracy.

Typically, an aerial camera system uses global shutter (GS) type CMOS or CCD sensors because the entire sensor is exposed at the same time. However, such global shutter sensors require significant circuitry that results in a reduction in the available area for light capture, have relatively low radiometric performance, and require relatively high power consumption, which ultimately reduces maximum frame rates and increases costs.

An alternative to global shutter type sensors, and by far the majority of sensors currently in use, are electronic rolling shutter (RS)-type sensors due to lower cost and superior performance.

However, rolling shutter (RS)-type sensors result in image distortion when the sensor or object in the image frame is under motion during exposure, because different scanlines in the sensor are exposed at different times. Hence, RS sensors are seldom used for metric measurement applications, such as aerial photography, because distortions to the captured images are extremely problematic for traditional image processing solutions which assume a GS camera model.

For example, as shown in FIGS. 3, 4a and 4b, a rolling shutter-type sensor 18 includes multiple scanlines 20 that are exposed sequentially in rapid succession. If the sensor 18 is stationary during scanning, an object 22 in the produced image 24 appears normal, as shown in FIG. 4a. However, if the camera is moving, for example in a direction 26 transverse to the scanning direction, the object appears skewed, as shown in FIG. 4b.

In a traditional aerial survey system, a camera model describes intrinsic (interior) and extrinsic (exterior) parameters of the camera(s). Intrinsic parameters include focal length, principal point, and radial distortion. Extrinsic parameters typically define the 3D position and pose (pointing direction) of a camera for each frame, for example using 6 parameters (x, y and z absolute position parameters; and ω, φ and κ rotational parameters). The 6 parameters for the frames captured during a survey are usually bundle adjusted as part of an aerial triangulation process in order to produce a refined solution for the parameters to an acceptable error threshold, typically using a reprojection error of 3D object space tie points and their corresponding observed features in image space.

However, with a RS-type camera system under motion each frame does not have a single position and pose. Instead each scanline potentially has a different position and pose, and therefore its own position and pose parameters.

Known techniques for performing a bundle adjustment process in this type of RS-type camera system include adjusting a small number of positions and poses in scanlines across each frame and interpolating for scanlines inbetween, treating the rotation and velocity rates as constant, and adjusting each frame in the time domain with a single additional parameter.

For aerial camera systems that have cameras arranged to move in order to capture more images, the problem is exacerbated.

Whilst the known bundle adjustment techniques for RS-type camera systems can result in as few as 1-6 additional parameters per frame to adjust, they are insufficient when the camera is under very rapid, non-linear motion, because significant residual distortions are produced by the system, or a large number of lines are required to be adjusted to obtain a suitable solution, which results in slow speed and poor convergence.

SUMMARY OF THE INVENTION

In accordance with a first aspect of the present invention, there is provided a bundle adjustment system for determining a solution for orientation information associated with a plurality of image frames captured by at least one rolling shutter camera, wherein the at least one rolling shutter camera is part of a rotating camera lens type imaging system having a camera lens that moves in an oscillating manner as image frames are captured, the system arranged to:

defining a plurality of pose time domain polynomials for the rolling shutter camera, the pose time domain polynomials together defining pose information for the rolling shutter camera for scanlines of an image frame captured by the rolling shutter camera, and each pose time domain polynomial including a plurality of parameters to be adjusted in a bundle adjustment process; and carry out a bundle adjustment process using the pose time domain polynomials to produce a bundle adjustment solution wherein the pose time domain polynomial parameters are adjusted to reduce error;

wherein the bundle adjustment process is arranged to use a bundle adjustment cost function wherein a cost measure of the cost function is a minimum distance error between 2 rays projected from 2 different locations of a tie point feature.

In an embodiment, the pose information is indicative of a pose of the at least one camera in terms of 3 orthogonal rotational position values.

In an embodiment, the system is arranged to define a pose time domain polynomial for each of the orthogonal rotational position values.

In an embodiment, each pose time domain polynomial is a $3^{rd}$ order polynomial including 4 parameters to be adjusted in the bundle adjustment process.

In an embodiment, the system is arranged to define position information indicative of a position of the at least one camera, for example in terms of 3 orthogonal coordinate values.

In an embodiment, the system arranged to define a position time domain polynomial for each of the orthogonal coordinate values.

In an embodiment, each position time domain polynomial is a $3^{rd}$ order polynomial including 4 parameters to be adjusted in the bundle adjustment process.

The system may be arranged to forward triangulate a set of matching tie point feature pairs for a particular tie point feature to provide a semi-dense mesh for later densification during 3D reconstruction and/or digital surface model (DSM) generation.

In an embodiment, parameters of the polynomials are initialised assuming no motion.

In an embodiment, parameters of the polynomials are initially calculated by fitting to known inertial navigation system (INS) data.

In an embodiment, the bundle adjustment process is arranged to use a bundle adjustment cost function wherein a cost measure of the cost function is a minimum distance error between 2 rays projected from 2 different locations of a tie point feature in image space.

In an embodiment, the rotating camera lens type imaging system has a camera lens that moves in an oscillating manner across track.

The rotating camera lens type imaging system may include at least one forward motion compensation component arranged to compensate for image blur caused by forward movement, and at least one across track compensation component arranged to compensate for image blur caused by across track movement.

In accordance with a second aspect of the present invention, there is provided a method of carrying out bundle adjustment to determine a solution for orientation information associated with a plurality of image frames captured by at least one rolling shutter camera, wherein the at least one rolling shutter camera is part of a rotating camera lens type imaging system having a camera lens that moves in an oscillating manner as image frames are captured, the method comprising:

defining a plurality of pose time domain polynomials for the rolling shutter camera, the pose time domain polynomials together defining pose information for the rolling shutter camera for scanlines of an image frame captured by the rolling shutter camera, and each pose time domain polynomial including a plurality of parameters to be adjusted in a bundle adjustment process; and carrying out a bundle adjustment process using the pose time domain polynomials to produce a bundle adjustment solution wherein the pose time domain polynomial parameters are adjusted to reduce error;

the bundle adjustment process using a bundle adjustment cost function wherein a cost measure of the cost function is a minimum distance error between 2 rays projected from 2 different locations of a tie point feature.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Figure 1:
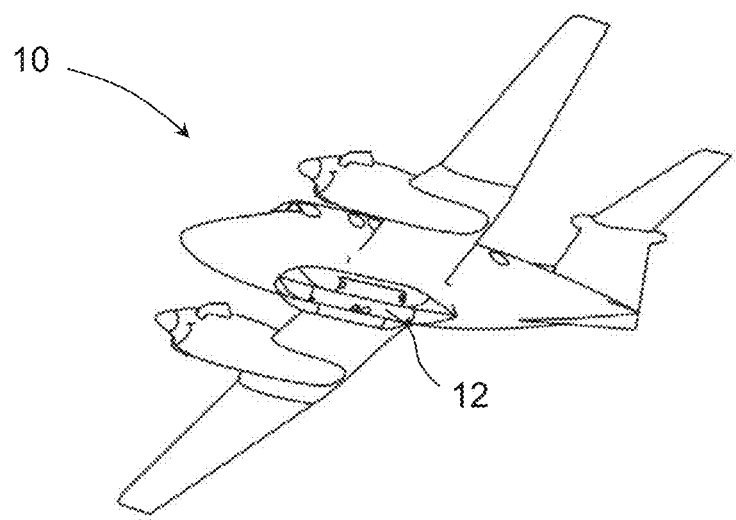
FIG. 1 is a diagrammatic representation of a survey aircraft incorporating an aerial camera system.
Figure 2:
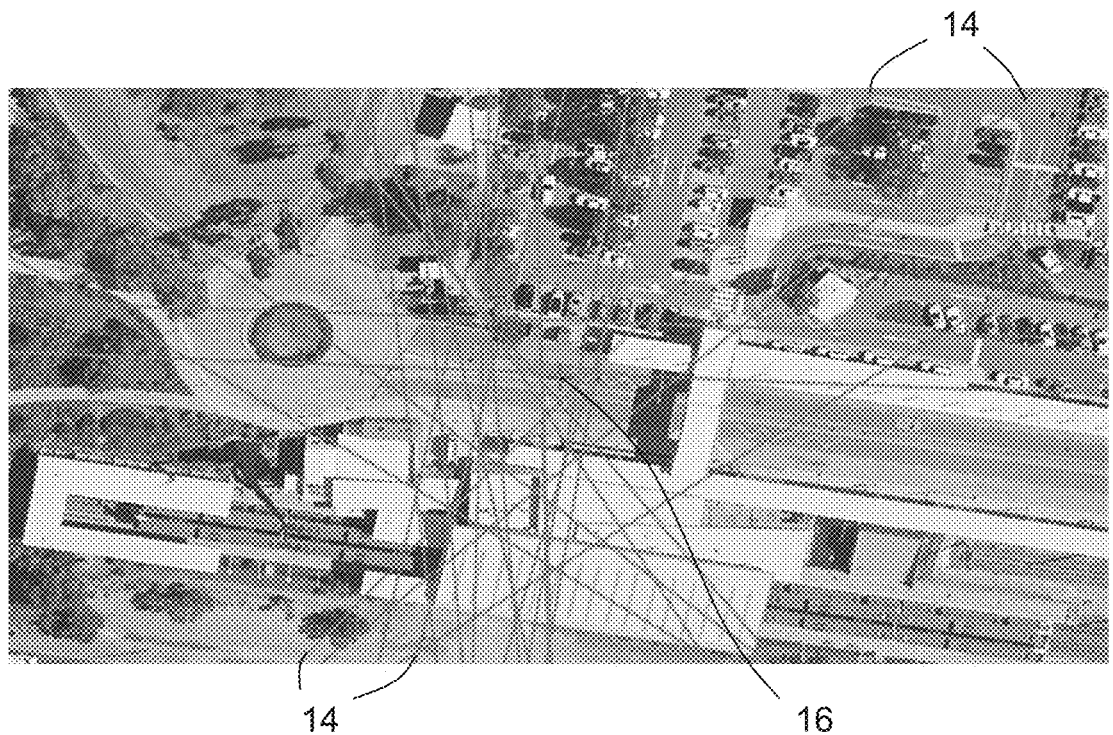
FIG. 2 shows epipolar lines of feature observations for a common control point in a conventional aerial survey.
Figure 3:
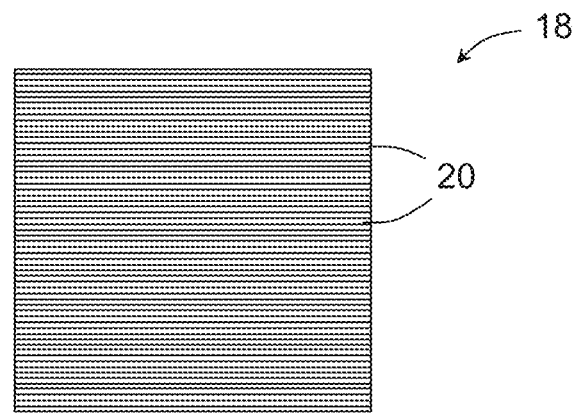
FIG. 3 is a diagrammatic representation of a rolling shutter type sensor.
Figure 4:
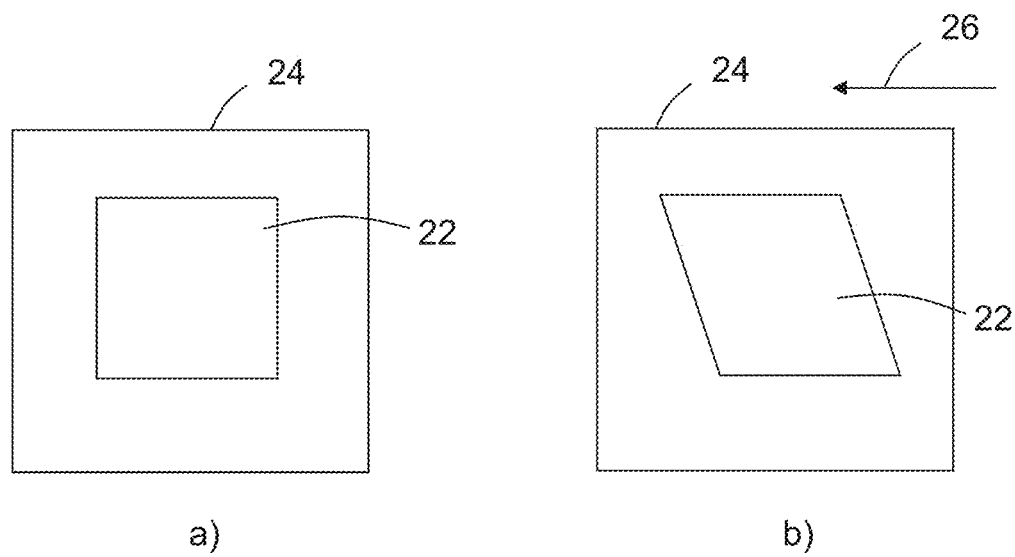
FIGS. 4a and 4b show effects of movement of a rolling shutter type sensor on a captured image.

Referring to FIG. 1 of the drawings, a survey aircraft 10 with mounted aerial camera system 12 is shown.

The present system and method is arranged to carry out a bundle adjustment process for such a camera system 12 that includes at least one rolling shutter (RS)-type sensor.

Figure 5:
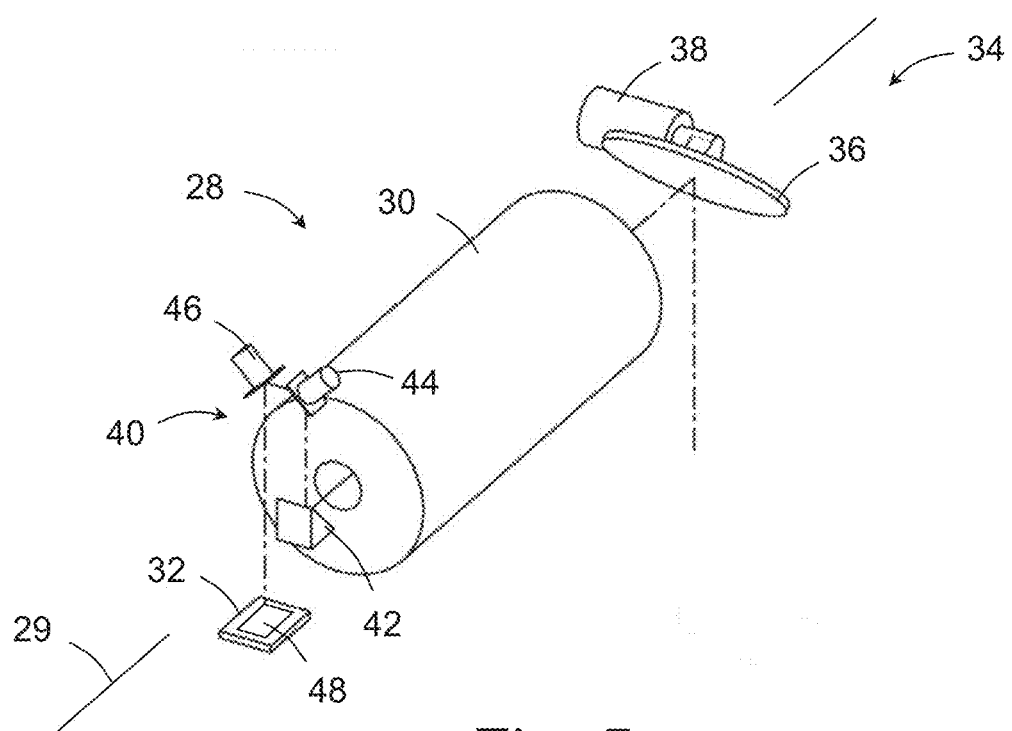
FIG. 5 is a diagrammatic perspective view of a camera assembly of an aerial camera system, the camera assembly including a stabilisation assembly.

As shown in FIG. 5, the aerial camera system 12 in this example is of a type described in applicants co-pending International Patent Application No. PCT/AU2015/000606, the contents of which are hereby incorporated by reference.

The aerial camera system 12 includes a camera assembly 28 arranged to rotate about a central longitudinal axis 29. The camera assembly 28 includes a lens assembly 30, a sensor assembly 32 and a steering mirror assembly 34. The steering mirror assembly 34 is mounted so as to be positioned at a nominal down angle of about 45° so that light from the ground directly beneath the survey aircraft 10 is directed towards the lens assembly 30 and is in turn focused by the lens assembly 30 onto the sensor assembly 32.

In this example, the lens assembly 30 has a focal length of about 376 mm, although other focal lengths are envisaged, such as 1800 mm.

The steering mirror assembly 34 in this example includes a steering mirror 36 and a steering actuator 38 arranged to controllably rotate the steering mirror 36 about a generally transverse axis. The steering actuator 38 may include a rotary piezo-electric mechanism.

The steering mirror assembly 34 operates so as to rotate the steering mirror 36 at a rate corresponding to the instantaneous speed of the survey aircraft 10 and in this way provides a degree of compensation for image blur caused by forward movement of the survey aircraft 10. This is achieved by effecting partial rotation of the steering mirror 36 in a direction so as to at least partially compensate for blur caused by forward motion of the survey aircraft 10, followed by rapid rotational movement of the steering mirror 36 in an opposite rotational direction to bring the steering mirror 36 back to a start position.

It will be understood that as the aircraft moves forwards, a plurality of images are captured 'across track', that is, in a direction perpendicular to the direction of movement of the survey aircraft 10, by rotating the camera assembly 28 about the central axis 29, capturing images periodically as the camera assembly 28 rotates, and repeatedly moving the camera assembly 28 back to a start rotational position.

While scanning the camera assembly 28 in this way enables multiple images to be captured at relatively low field of view with a lens of relatively high focal length and thereby relatively high resolution, rotating the camera assembly 28 causes significant image blur.

Image blur is also affected by movement of the survey aircraft 10, including instantaneous roll of the survey aircraft 10.

In order to at least partially compensate for image blur, the camera assembly 28 also includes a stabilisation assembly 40 including a primary mirror 42 that receives light from the lens assembly 30 and reflects the light at 90° towards a first fast steering mirror 44. The first fast steering mirror 44 reflects the light at approximately 90° towards a second fast steering mirror 46, which then reflects the light at approximately 90° towards the sensor assembly 32.

In this example, each of the first and second fast steering mirrors 44, 46 is a front coated optically flat articulating mirror mounted to an actuator that is capable of rapidly rotating a movable mirror, in this embodiment using a rotary piezo-electric mechanism. By synchronizing rotational movement of the articulating mirrors with rotational movement of the lens assembly 30, it is possible to effectively stabilize an image on the sensor of the sensor assembly 32 and thereby reduce image blur.

The survey aircraft 10 also includes an Inertial Navigation System (INS) having a GPS unit and an Inertial Measurement Unit (IMU). The INS is arranged to determine the movement, position and orientation of the survey aircraft 10 in real time and thereby provide information usable to determine estimated camera positions and poses (pointing direction) for captured images in terms of x, y and z absolute position parameters and $\omega$, $\varphi$ and $\kappa$ rotational parameters.

The camera assembly 28 is arranged such that the field of regard (FoR) is directed generally vertically downwards in order to capture images of the ground directly beneath the survey aircraft 10. In this example, the images are used to produce high resolution ortho imagery with approximately 70% forward and 2% side overlap between frames, and approximately 70% side overlap between the ground coverage footprints of adjacent flight lines.

This arrangement provides a relatively high redundancy for the images captured by the camera assembly 28.

The sensor assembly 32 includes a rolling shutter (RS)-type sensor 48 and as such multiple scanlines of the sensor are exposed sequentially in rapid succession. Since the present camera assembly is moving during RS exposure, each scanline of the RS sensor 48 potentially has a different position and pose, and therefore its own position and pose parameters for bundle adjustment.

In order to produce an accurate camera model for use in bundle adjustment, the position and pose for each scanline of an image frame may be modelled as a plurality of low-order polynomials in the time domain. For a $3^{rd}$ order polynomial, the position/pose will be given by:

$$\text{Position/pose} = at^3 + bt^2 = ct + d$$

where t is time and a, b, c and d are unknown constant parameters.

The position of each scanline is given by x, y and z position values, and the pose of each scanline is given by $\omega$, $\varphi$ and $\kappa$ rotational values. Therefore, using the above $3^{rd}$ order polynomial for each of the 6 position and pose values gives 24 unknown parameters per frame.

The order of the polynomial is selected to provide enough freedom to model a real-world trajectory. In practice, a 3rd order polynomial has been found to be sufficient even under rapid accelerations.

Since absolute positional information provided by the INS is generally very accurate (<10 cm) and any residual errors in position typically result in imperceptible projection errors, in most instances in order to provide a good bundle adjustment solution it is only necessary to model the 12 rotation polynomial parameters per image frame, and not the 12 absolute position polynomial parameters.

Figure 6:
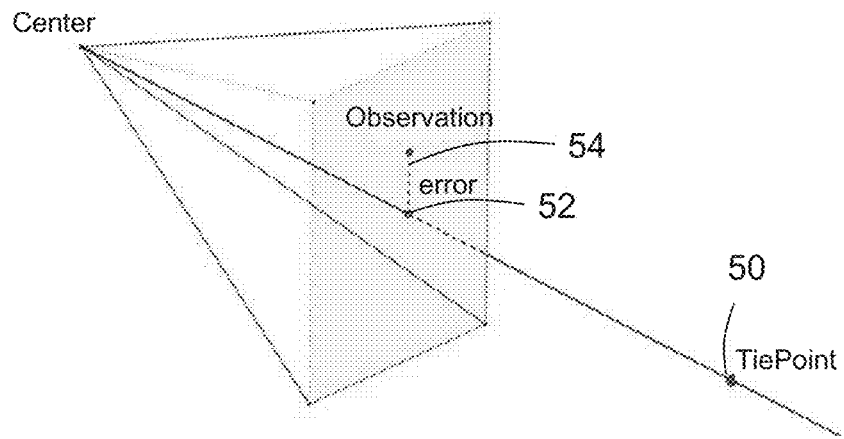
FIG. 6 is a diagrammatic representation of a cost function wherein a 3D tie point is projected to a 2D pixel and the resultant reprojection error calculated in image space.

As shown in FIG. 6, a standard bundle adjustment cost function requires projecting a 3D tie point 50 to a 2D pixel 52, and calculating the resultant reprojection error 54 in image space. The reprojection error 54 is then minimised during bundle adjustment by adjusting the camera intrinsic and extrinsic parameters.

Figure 7:
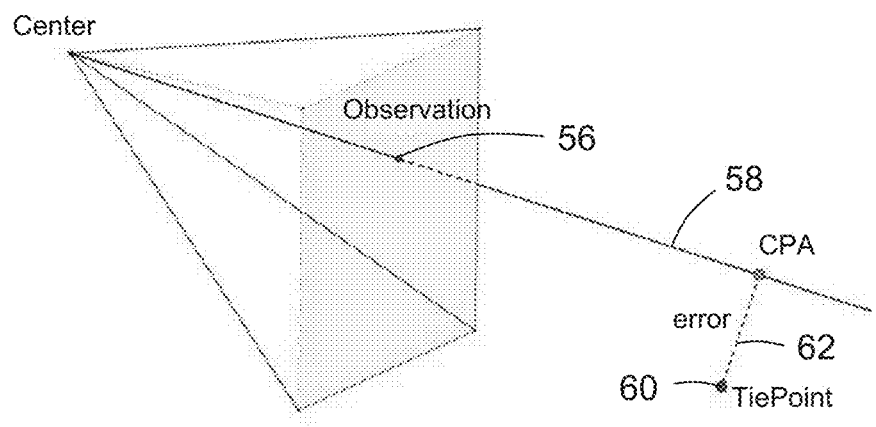
FIG. 7 is a diagrammatic representation of a cost function wherein a 2D location of a tie point feature is projected to a 3D ray in object space, and the minimum distance from the ray to an estimated 3D point calculated in object space.

Alternately, as shown in FIG. 7, the cost function can work in object space by projecting 2D locations 56 of the tie point features to 3D rays 58 in object space, and measuring the minimum distance 62 from the rays 58 to the estimated 3D points 60. The distance error 62 is then minimised during bundle adjustment by adjusting intrinsic and extrinsic parameters.

As the ability to produce a good bundle adjustment solution is dependent on the number and distribution of tie points across each image, for a camera model with a RS-type sensor that captures scanlines in rapid succession, it is necessary to generate sufficient tie points per image frame, typically more than are required for a GS camera model. Between 500 and 1000 well distributed tie points per Mpixel provides a very rigorous bundle adjustment solution. However, for relatively large surveys, this results in very large matrices to be solved.

Ignoring intrinsic parameters which are specific to a camera, and using fixed position parameters and polynomials for camera pose values, the number of parameters to solve in a bundle adjustment process for a RS-type sensor camera model in a survey becomes the number of parameters for the pose polynomials, plus the number of parameters for the tie points (which can be expressed as x, y and z position parameters). The number of parameters to solve can therefore be expressed as:

$$Nparam=12 \times Nphotos+3 \times Npoints$$

where Nphotos is the number of images captured in the survey, and Npoints is the number of tie points used.

Therefore, for a survey that captures 1000 images of 35 Mpixel resolution and uses 2.5 million tie points, 7,512,000 parameters are required to be processed and adjusted during bundle adjustment. This can result in very slow bundle adjustment performance.

Figure 8:
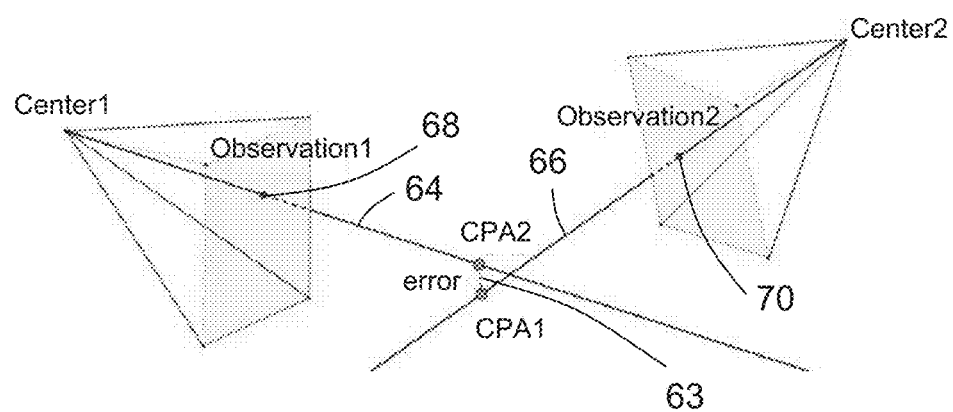
FIG. 8 is a diagrammatic representation of a cost function whereby the distance between two rays projected from two different 2D locations of a tie point feature in image space is used as a cost measure in a bundle adjustment process.

In order to further reduce the number of parameters that are required to be processed during bundle adjustment, a different cost measure can be used in the cost function of the bundle adjustment process. As shown in FIG. 8, it is possible to eliminate the 3D tie point locations from the cost function, if the distance 63 between two rays 64, 66 projected from two different 2D locations of each tie point feature 68, 70 in image space is used as the cost measure in the bundle adjustment process. In this way, the bundle adjustment process operates to minimise the distance error 63 between each pair of rays 64, 66 associated with a tie point feature.

Using this approach, the number of parameters to adjust becomes:

$$Nparam=12 \times Nphotos$$

Therefore, for a survey that captures 1000 image frames, only 12,000 parameters are required to be processed and adjusted during bundle adjustment, which significantly improves the speed of bundle adjustment.

As a result of the reduction in complexity of the bundle adjustment process, the number of tie points used in the bundle adjustment process can be significantly increased while still maintaining a sufficiently fast bundle adjustment process, thereby making the bundle adjustment much more robust.

Once the bundle adjustment process is complete, the actual tie point locations in object space can be calculated if required using forward triangulation.

Additionally, as the above cost function works with pairs of projected rays associated with a tie point projected from image space, once a robust solution is found, the entire set of matching tie point feature pairs for a particular tie point feature can be forward triangulated and filtered for accuracy to provide a semi-dense mesh for later densification during 3D reconstruction and/or digital surface model (DSM) generation.

Using the above described RS sensor-type camera model, the residual error of a test block captured with a RS sensor-type camera under rapid motion and angular accelerations was 0.452 pixels RMS.

Figure 9:
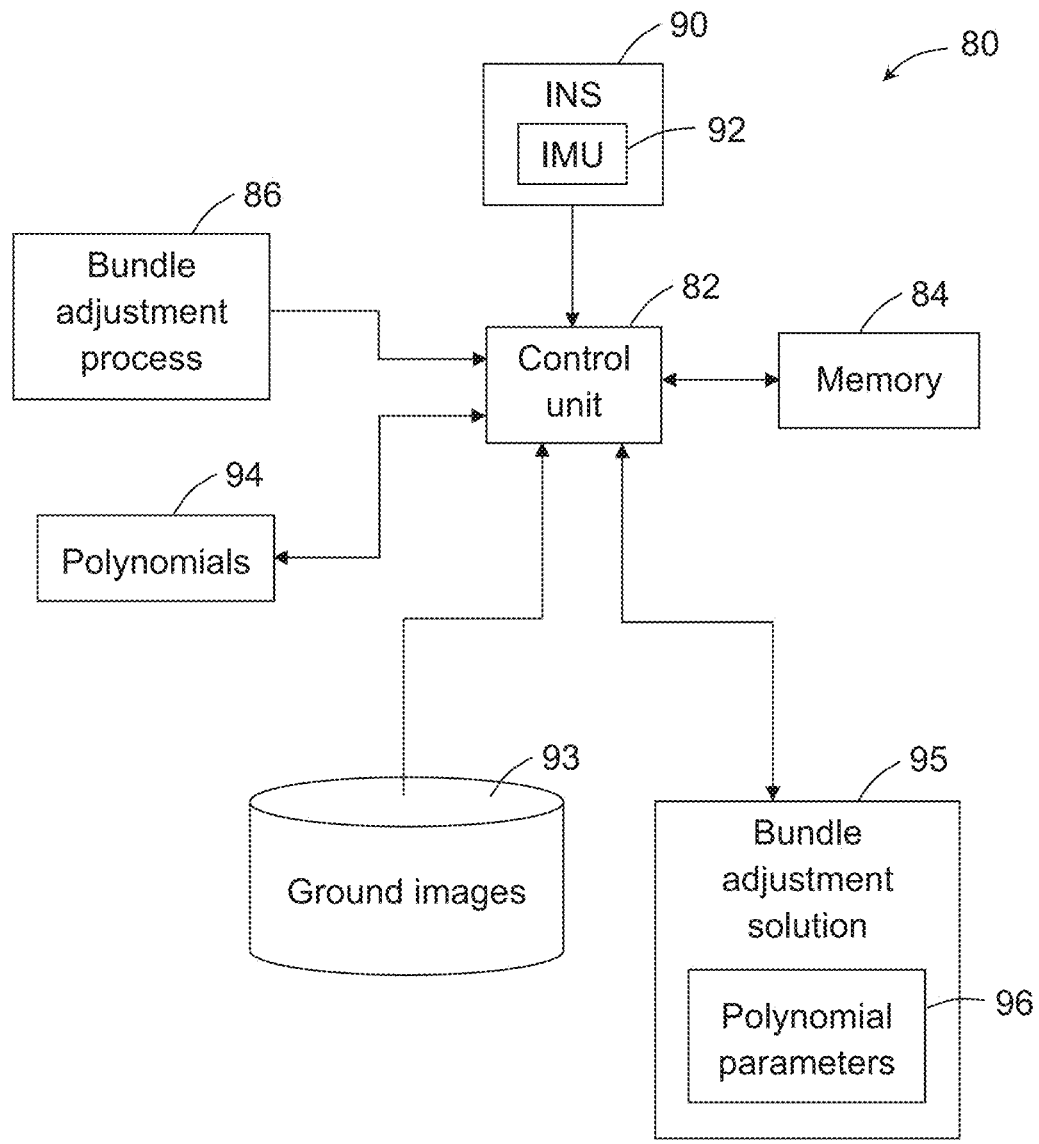
FIG. 9 is a block diagram illustrating operative components of a bundle adjustment system in accordance with an embodiment of the present invention.

Operative components of a bundle adjustment system 80 are shown in FIG. 9.

The system 80 includes a control unit 82 arranged to control and coordinate operations in the system 80 and a memory 84 arranged to load processes implemented by the control unit 82. In this example, the system 80 is implemented using a personal computer and as such the control unit may be implemented using a processor and associated programs. However, it will be understood that any suitable implementation is envisaged.

The system 80 implements a bundle adjustment process 86, data indicative of which is stored in a suitable data storage device, based on information obtained from an inertial navigation system (INS) 90 and in particular an inertial measurement unit (IMU) 92, ground images 93 captured during an aerial survey in the form of a plurality of ground image scanlines for each image, and polynomials 94 created to model the camera pose/position during capture of an image by a RS-type sensor 48. The system produces a bundle adjustment solution 95 that includes polynomial parameters 96 for the polynomials 94.

Figure 10:
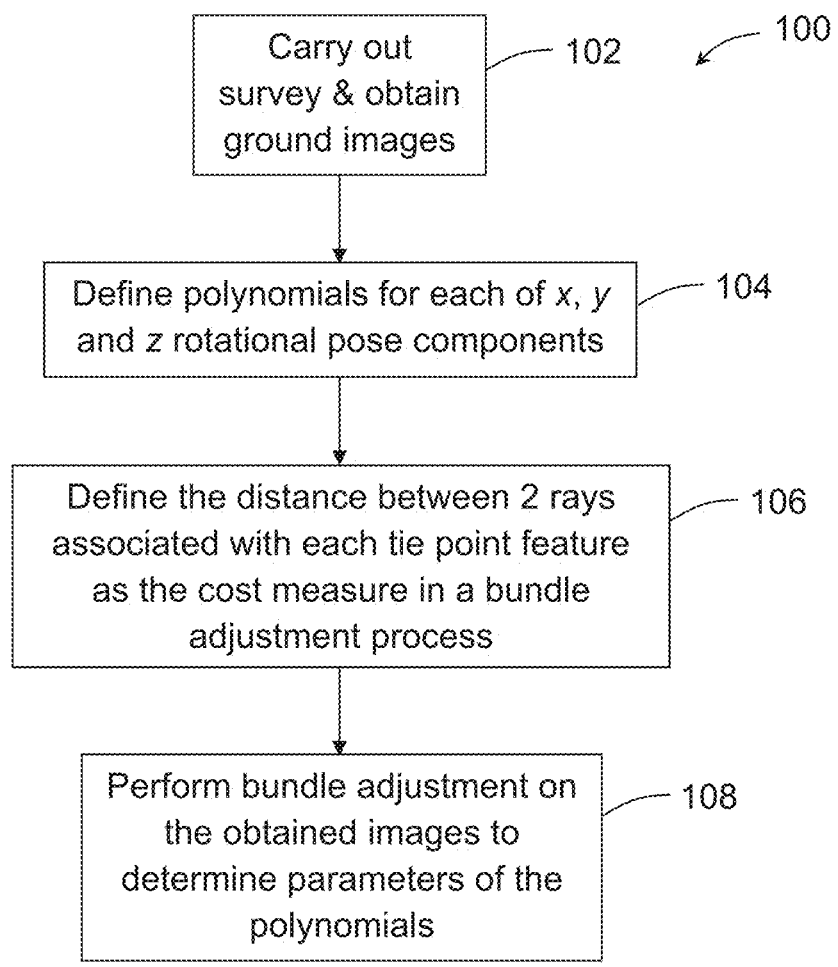
FIG. 10 is a flow diagram illustrating a method of carrying out a bundle adjustment process according to an embodiment of the present invention.

As shown in FIG. 10, a flow diagram 100 is shown including steps 102 to 108 of an example process for performing a bundle adjustment process for a camera system.

In this example, the absolute position of the camera system is considered to be constant during capture of an image frame, and the cost measure for the cost function of the bundle adjustment process that is used by the bundle adjustment process is the minimum distance between rays projected from 2 different tie point observations in 2D image space.

After a survey is carried out 102 and image frames having multiple image scanlines are obtained, a polynomial is defined 104 for each of ω, φ and κ rotational components of the pose of the camera system for each image frame. The cost measure for the bundle adjustment cost function is defined 106 as the closest distance between 2 projection rays from different 2D locations of a tie point feature in image space. A bundle adjustment process is then implemented 108 on captured ground images 92 and associated polynomials by loading bundle adjustment program data 86 from a data storage device.

As part of the bundle adjustment solution 93, a distinct set of ω, φ and κ polynomial parameters is obtained for the image frames, and therefore a distinct set of time dependent polynomials defining camera pose is obtained for the image frames. The actual locations of the tie points can then be calculated.

Modifications and variations as would be apparent to a skilled addressee are deemed to be within the scope of the present invention.

The claims defining the invention are as follows:

1. A bundle adjustment system for determining a solution for orientation information associated with a plurality of image frames captured by at least one rolling shutter camera, the bundle adjustment system comprising:
   a computer processor; and
   a non-transitory computer memory storing executable programs that, when executed, cause the computer processor to:
   define a plurality of pose time domain polynomials for a rolling shutter camera in a rotating camera lens type imaging system having a camera lens that moves across track in an oscillating manner and captures image frames as the camera lens moves, the pose time domain polynomials together defining pose information for the rolling shutter camera for scanlines of an image frame captured by the rolling shutter camera, and each pose time domain polynomial including a plurality of parameters to be adjusted in a bundle adjustment process; and carry out a bundle adjustment process using the pose time domain polynomials to produce a bundle adjustment solution wherein the parameters of the pose time domain polynomials are adjusted to reduce error; and wherein the bundle adjustment process is arranged to use a bundle adjustment cost function wherein a cost measure of the cost function is a minimum distance error between two rays projected from two different locations of a tie point feature.

2. The bundle adjustment system as claimed in claim 1, wherein the pose information is indicative of a pose of the at least one rolling shutter camera in terms of three orthogonal rotational position values.

3. The bundle adjustment system as claimed in claim 2, wherein the executable programs, when executed, cause the computer processor to define a pose time domain polynomial for each of the orthogonal rotational position values.

4. The bundle adjustment system as claimed in claim 2, wherein each pose time domain polynomial is a third order polynomial including four parameters to be adjusted in the bundle adjustment process.

5. The bundle adjustment system as claimed in claim 1, wherein the executable programs, when executed, cause the computer processor to define position information indicative of a position of the at least one rolling shutter camera.

6. The bundle adjustment system as claimed in claim 5, wherein the executable programs, when executed, cause the computer processor to define position information indicative of a position of the at least one rolling shutter camera in terms of three orthogonal coordinate values.

7. The bundle adjustment system as claimed in claim 6, wherein the executable programs, when executed, cause the computer processor to define a position time domain polynomial for each of the orthogonal coordinate values.

8. The bundle adjustment system as claimed in claim 7, wherein each position time domain polynomial is a third order polynomial including four parameters to be adjusted in the bundle adjustment process.

9. The bundle adjustment system as claimed in claim 1, wherein the executable programs, when executed, cause the computer processor to use a bundle adjustment cost function wherein a cost measure of the cost function is a minimum distance error between two rays projected from two different locations of a tie point feature in image space.

10. The bundle adjustment system as claimed in claim 9, wherein the executable programs, when executed, cause the computer processor to forward triangulate a set of matching tie point feature pairs for a particular tie point feature to provide a semi-dense mesh for later densification during 3D reconstruction and/or digital surface model (DSM) generation.

11. The bundle adjustment system as claimed in claim 1, wherein the rotating camera lens type imaging system includes at least one forward motion compensation component arranged to compensate for image blur caused by forward movement, and at least one across track compensation component arranged to compensate for image blur caused by across track movement.

12. A method of carrying out bundle adjustment to determine a solution for orientation information associated with a plurality of image frames captured by at least one rolling shutter camera, the method comprising:

defining a plurality of pose time domain polynomials for the rolling shutter camera in a rotating camera lens type imaging system having a camera lens that moves across track in an oscillating manner and captures image frames as the camera lens moves, the pose time domain polynomials together defining pose information for the rolling shutter camera for scanlines of an image frame captured by the rolling shutter camera, and each pose time domain polynomial including a plurality of parameters to be adjusted in a bundle adjustment process; and carrying out the bundle adjustment process using the pose time domain polynomials to produce a bundle adjustment solution wherein the parameters of the pose time domain polynomials are adjusted to reduce error; and the bundle adjustment process using a bundle adjustment cost function wherein a cost measure of the cost function is a minimum distance error between two rays projected from two different locations of a tie point feature.

13. The method as claimed in claim 12, wherein the pose information is indicative of a pose of the at least one rolling shutter camera in terms of three orthogonal rotational position values.

14. The method as claimed in claim 13, comprising defining a pose time domain polynomial for each of the orthogonal rotational position values.

15. The method as claimed in claim 13, wherein each pose time domain polynomial is a third order polynomial including four parameters to be adjusted in the bundle adjustment process.

16. The method as claimed in claim 12, comprising defining position information indicative of a position of the at least one rolling shutter camera.

17. The method as claimed in claim 16, comprising defining position information indicative of a position of the at least one rolling shutter camera in terms of three orthogonal coordinate values.

18. The method as claimed in claim 17, comprising defining a position time domain polynomial for each of the orthogonal coordinate values.

19. The method as claimed in claim 18, wherein each position time domain polynomial is a third order polynomial including four parameters to be adjusted in the bundle adjustment process.

20. The method as claimed in claim 12, comprising using a bundle adjustment cost function wherein a cost measure of the cost function is a minimum distance error between two rays projected from two different locations of a tie point feature in image space.

21. The method as claimed in claim 20, comprising forward triangulating a set of matching tie point feature pairs for a particular tie point feature to provide a semi-dense mesh for later densification during 3D reconstruction and/or digital surface model (DSM) generation.

22. The method as claimed in claim 12, wherein the rotating camera lens type imaging system includes at least one forward motion compensation component arranged to compensate for image blur caused by forward movement, and at least one across track compensation component arranged to compensate for image blur caused by across track movement.

* * * * *